United States Patent
Reece et al.

(10) Patent No.: US 11,163,929 B1
(45) Date of Patent: *Nov. 2, 2021

(54) GENERATE CLOCK NETWORK USING INVERTING INTEGRATED CLOCK GATE

(71) Applicant: Cadence Design Systems, Inc., San Jose, CA (US)

(72) Inventors: William Robert Reece, Over (GB); Thomas Andrew Newton, Great Cambourne (GB); Ruth Patricia Jackson, Cambridge (GB); Zhuo Li, Austin, TX (US)

(73) Assignee: Cadence Design Systems, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/735,672

(22) Filed: Jan. 6, 2020

(51) Int. Cl.
*G06F 30/337* (2020.01)
*G06F 117/04* (2020.01)
*G06F 30/398* (2020.01)
*G06F 119/12* (2020.01)

(52) U.S. Cl.
CPC ........ *G06F 30/337* (2020.01); *G06F 2117/04* (2020.01)

(58) Field of Classification Search
CPC .. G06F 30/337; G06F 2117/04; G06F 30/396; G06F 30/398; G06F 2119/12; G06F 119/12; G06F 117/04
See application file for complete search history.

(56) References Cited

U.S. PATENT DOCUMENTS

| | | | |
|---|---|---|---|
| 10,380,287 B1* | 8/2019 | Meyer | G06F 30/396 |
| 10,860,761 B1* | 12/2020 | Vanukuri | G06F 1/28 |
| 2007/0241770 A1* | 10/2007 | Rohe | H03K 19/17796 326/38 |
| 2011/0304371 A1* | 12/2011 | Ravi | H03K 3/017 327/175 |
| 2017/0061057 A1* | 3/2017 | Lee | G06F 30/39 |

* cited by examiner

*Primary Examiner* — Vuthe Siek
(74) *Attorney, Agent, or Firm* — Schwegman Lundberg & Woessner, P.A.

(57) ABSTRACT

Various embodiments provide for clock network generation for a circuit design using an inverting integrated clock gate (ICG). According to some embodiments, a clock network with one or more inverting ICGs is generated, after a topology of the clock network is defined, by applying a non-inverting ICG-to-inverting ICG transform to one or more nodes of the clock network that comprise a non-inverting ICG. Additionally, according to some embodiments, a clock network is generated bottom-up (from the clock sinks to the root clock signal source) using one or more inverting ICGs.

18 Claims, 10 Drawing Sheets

GENERATE CLOCK NETWORK USING INVERTING INTEGRATED CLOCK GATE

TECHNICAL FIELD

Embodiments described herein relate to circuit design and, more particularly, to systems, methods, devices, and instructions for generating a clock network of a circuit design using an inverting integrated clock gate (ICG), which may be part of electronic design automation (EDA).

BACKGROUND

As a part of designing a circuit, such as an integrated circuit (IC) circuit, an electronic design automation (EDA) software system commonly performs generation of a clock distribution network (also referred to as a clock tree), which uses a branching network to distribute a clock signal from a clock signal source to a plurality of clock sinks within a circuit design. The clock sinks usually comprise circuit devices in the circuit design that are designed to be clocked and thus need a clock signal to operate. Examples of clock sinks include, without limitations, flip-flops or other sequential circuit devices that rely on a clock signal to synchronize their operations. A clock sink can receive a clock signal via a clock pin included by the clock sink.

Typically, generation of a clock network comprises two phases: (1) generation of a top level of the clock network; and (2) generation of a bottom level of the clock network (also referred to as a subordinate clock tree). The top level can comprise a clock network that delivers a clock signal to a set of clock tapping point nodes (hereafter, clock taps) distributed across a floorplan of a circuit design. Before the bottom level is generated, a set of clock pins (clock pins of each clocked device) is usually assigned to the set of clock taps. This is often referred to as clock-tap-to-clock-pin assignment, or simply clock tap assignment. The bottom level comprises a set of clock trees (generated during clock tree synthesis (CTS)) between each clock tap and their assigned clock pins, thereby delivering the clock signal from the set of clock taps to the set of clock pins.

Generally, a generated clock network comprises a branching network of fan-out buffers or fan-out inverters to distribute a clock signal from a root clock signal source to a set of clock pins within the circuit design. Additionally, nodes of a clock network can comprise a logical or control function in the path from a clock source to a control pin, such as a clock-gate or integrated clock gate (ICG), which can be used to turn off the pin and logic paths they contribute to. Under designed, specific conditions, a final circuit resulting from a given circuit design can use an ICG to turn off a cluster of clock pins (also referred to as an ICG group) if the cluster is not required for certain operations of the final circuit for the active operation of the IC. In this way, the ICG can permit the final circuit to save power that would otherwise be consumed by the cluster had it not been gated from the clock tap by the ICG. The basic clock gating topology of a clock network is defined during CTS. Though CTS may alter the clock gating topology by cloning and merging ICGs, the basic gating structure usually remains unchanged.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
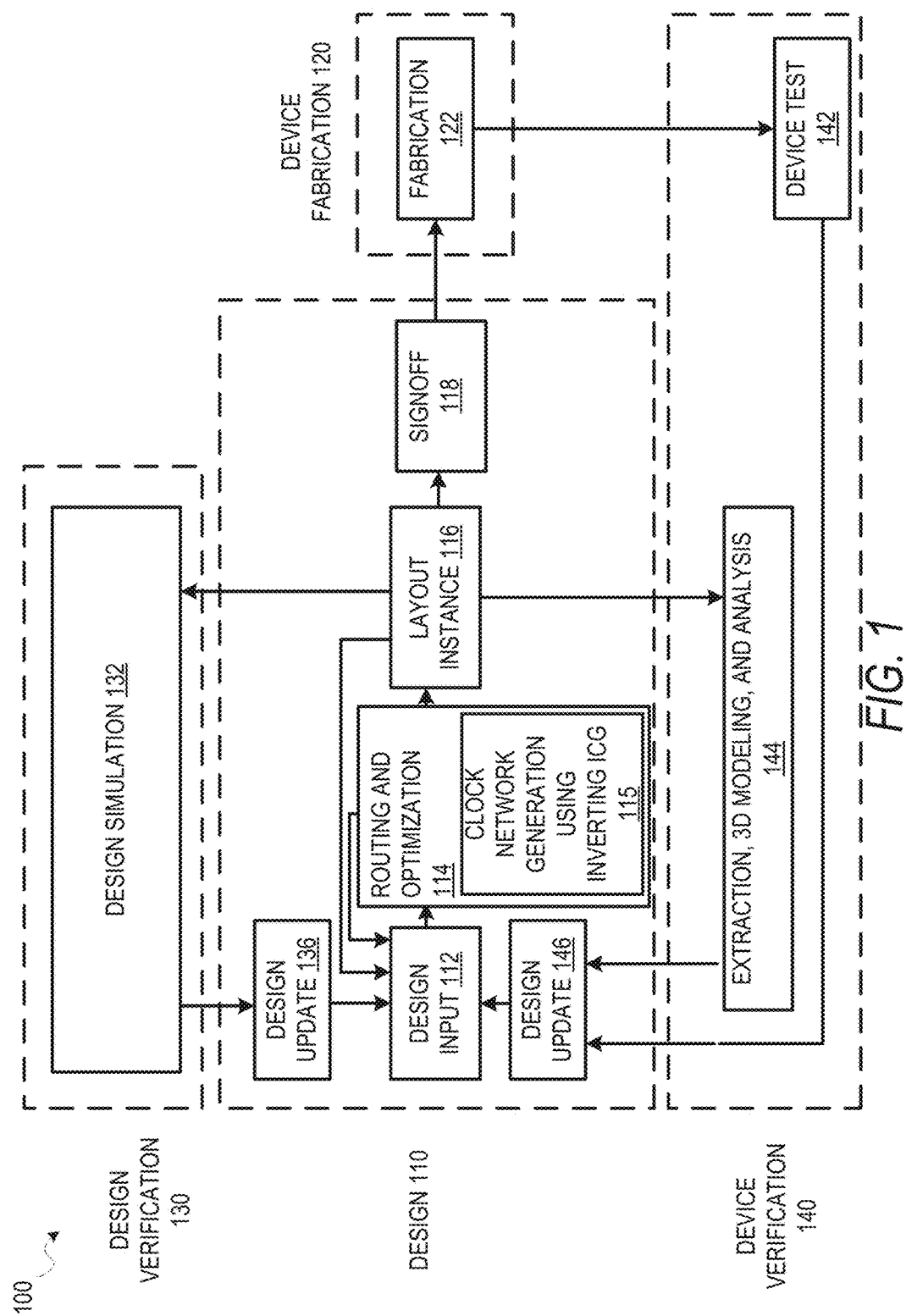
FIG. 1 is a diagram illustrating an example design process flow for generating a clock network for a circuit design using an inverting integrated clock gate (ICG), according to some embodiments.

Various embodiments provide for generating a clock network with an inverting integrated clock gate (ICG) for a circuit design. For some embodiments, the methodologies described herein are performed during or as part of clock tree synthesis (CTS). According to some embodiments, a clock network with one or more inverting ICGs is generated, after a topology (e.g., basic tree topology) of the clock network is defined, by applying a non-inverting ICG-to-inverting ICG transform to one or more nodes of the clock network that comprise a non-inverting ICG (e.g., swapping the non-inverting ICG with an inverting ICG). Additionally, according to some embodiments, a clock network is generated bottom-up (from the clock sinks to the root clock signal source) by selecting and using a non-inverting ICG or an inverting ICG (e.g., resulting in a clock network that comprises at least one inverting ICG and one non-inverting ICG).

Traditionally, clock networks for circuit designs have been generated using non-inverting ICGs, which usually pass a clock signal on the same edge as the clock sinks coupled to a clock network (e.g., edge that triggers a flip-flop also triggers a non-inverting ICG). Additionally, clock networks usually include one or more inverter cells (or inverters) as a means of satisfying one or more design rules constraints that may be associated with a circuit design. Generally, inverters are used at advanced nodes of a clock network (e.g., at nodes comprising integrated clock gates) due to their pulse width shaping properties. However, this also means that when inverters are added to a clock network, they are usually added in ways that keep the aggregate clock signal polarity unchanged within the clock network (e.g., adding inverters in pairs). Accordingly, the conventional approach for implementing a clock network that includes one or more inverters has been to use a non-inverting ICG and pairs of inverters above or below the non-inverting ICG (e.g., to avoid DRV issues). For circuit designs that are heavily clock-gated, topological constraints may mean that inverters added for polarity fixing purposes are not necessary from a DRV point of view and could be removed where possible.

Based on the recent introduction of inverting ICGs, various embodiments described herein can use one or more inverting ICGs, either during construction of a clock network or as a post-process applied to an existing clock network, to generate a clock network. In comparison to a non-inverting ICG, an inverting ICG can pass a clock signal on the opposite edge of the clock sinks coupled to the clock signal (e.g., a rising edge on the input signal of an inverting ICG generates an output signal with a falling edge). Unlike traditional clock network generation, embodiments described herein can use one or more inverting ICGs to avoid use of (e.g. absorb) one or more inverting stages (e.g., inverting stages used for polarity fixing purposes) that would otherwise be included within a clock network generated by traditional means. Use of some embodiments described herein can reduce cell count (e.g., by reducing inverter count) within a clock network (which can improve congestion and routability within a circuit design), can reduce power consumption by the circuit design (e.g., by reducing inverter count and clock wires), can reduce area or wirelength used by the clock network (e.g., by reducing inverting cell count and clock wires), and can reduce insertion delay within the circuit design, while also meeting DRV constraints.

According to some embodiments, a clock network is generated by a process that applies one or more transforms on an existing clock network (e.g., one comprising a basic tree topology) that comprises one or more non-inverting ICGs. For example, a process of an embodiment can comprise post-processing an existing clock network after the basic tree topology of the existing clock network is defined. Such a process can explicitly score a transform (e.g., non-inverting ICG-to-inverting ICG transform) by scoring a quality of an existing clock network before and after the transform to determine if the transform improves the existing clock network (e.g., reduces insertion delay, reduces power usage, or both).

For instance, the process (e.g., the post-processing) can comprise traversing a clock network (e.g., having a basic clock tree topology) either top-down (from a root clock source to one or more clock sinks) or bottom-up (from one or more clock sinks to a root clock source). While traversing the clock network, in response to traversing to a node that comprises an ICG (e.g., non-inverting ICG or an inverting ICG): generating a current quality score (e.g., calculating by a scoring function) for the current version of the clock network prior to a transformation; applying a transform to the ICG (e.g., either swapping a non-inverting ICG with an inverting ICG or swapping an inverting ICG with a non-inverting ICG and adding or removing inverters) to generate a new version of the clock network; attempting to resolve (e.g., fix) the new version of the clock network to resolve one or more DRVs that result from applying the transform (e.g., DRVs resulting from sizing or moving the ICG and the new fanout of the transformed ICG) and rejecting the transform if resolving the one or more DRVs is not possible; and generating a new quality score (e.g., calculating by the same scoring function) for the new version of the clock network after application of the transform. Example scoring functions used to generate quality score can include, without limitation, a function to measure power usage of a clock network, a function to measure wirelength of a clock network, a function to measure capacitance of a clock network, and the like.

Subsequently, the process can replace the current version of the clock network with the new version of the clock network (e.g., accept the transformation) in response to the new quality score representing an improvement in comparison to the current quality score, and continue traversal of the current version of the clock network (e.g., if an additional node remains for traversal). Alternatively, the process can keep the current version of the clock network (e.g., reject the transformation) in response to the new quality score not representing an improvement in comparison to the current quality score, and continue traversal of the current version of the clock network (e.g., if an additional node remains for traversal). Additionally, the process can keep the current version of the clock network (e.g., reject the transformation) in response to not being able to resolve one or more DRVs of the new version of the clock network after the transformation, and continue traversal of the current version of the clock network (e.g., if an additional node remains for traversal).

With respect to a clock network node that comprises a non-inverting ICG, if the output of the non-inverting ICG is connected to (e.g., fan-out of non-inverting ICG comprises) only inverters, an example non-inverting ICG-to-inverting ICG transform can comprise: swapping the non-inverting ICG with an inverting ICG; and removing those inverters from the clock network. In another instance, with respect to a clock network node that comprises a non-inverting ICG, if the output of the non-inverting ICG is connected to (e.g., fan-out of non-inverting ICG comprises) a mixture of one or more inverters and one or more non-inverter cells (e.g., non-inverting ICG is driving a mixture of inverters and non-inverters), an example non-inverting ICG-to-inverting ICG transform can comprise: swapping the non-inverting ICG with an inverting ICG; removing the one or more inverters; and adding one or more inverters above the one or more non-inverter cells (e.g., above the non-inverting fanout) between the inverting ICG and the one or more non-inverter cells.

Though various embodiments are described herein with respect to swapping a non-inverting ICG with an inverting ICG, some embodiments can use a reverse transform that swaps an inverting ICG with a non-inverting ICG within a clock network. For instance, with respect to a clock network node that comprises an inverting ICG, an example inverting ICG-to-non-inverting ICG transform can comprise swapping the inverting ICG with a non-inverting ICG; and adding a layer of one or more inverters below the non-inverting ICG (e.g., add enough inverters below to satisfy one or more DRV constraints).

According to some embodiments, a clock network is generated bottom-up (from the clock sinks to the root clock signal source) by selecting and using a non-inverting ICG or an inverting ICG (e.g., resulting in a clock network that comprises at least one inverting ICG and one non-inverting ICG). For instance, the process of generating the clock network bottom-up can comprise: annotating one or more clock sinks with a polarity indicator (e.g., polarity flag) that indicates their respective polarity requirement (e.g., needs-Inversion flag that can be set to true or false); and proceeding with bottom-up construction of the clock network while monitoring for any node that comprises an ICG (e.g., per data describing the circuit design). In response to reaching a node of the clock network that comprises an ICG, the bottom-up generation process can determine one or more cells currently connected to an output of the ICG and, based on this determination, determine whether the ICG is capable of driving one or more cells currently connected to an output of the ICG (e.g., whether the ICG can drive its current fan-out). While the ICG is not capable of driving one or more cells currently connected to an output of the ICG, the bottom-up generation process can continue to perform the following operations: inserting a layer of one or more inverters below the ICG such that one or more cells (e.g., fan-out cells) currently being driven by the ICG are now driven by the inserted layer of one or more inverters and such that the inserted layer of one or more inverters is now connected to an output of the ICG; propagating the polarity indicators of the one or more cells previously being driven by the ICG to the inserted layer of one or more inverters (e.g., needsInversion flag value of a cell propagates to an inverter of the inserted layer); and flipping the polarity indicators propagated to the inserted layer of one or more inverters (e.g., false is now true and true is now false). Once the ICG is capable of driving one or more cells currently connected to an output of the ICG, the bottom-up generation process can use a non-inverting ICG for the ICG if the one or more cells currently connected to an output of the ICG have a polarity indicator that indicates that inversion is not needed (e.g., needsInversion flag is set to false). Alternatively, the bottom-up generation process can use an inverting ICG for the ICG if the one or more cells currently connected to an output of the ICG have a polarity indicator that indicates that inversion is needed (e.g., needsInversion flag is set to true). For various embodiments, a non-inverting ICG is used for the ICG only if all the one or more cells have a polarity indicator that indicates that inversion is not needed, and an inverting ICG is used for the ICG only if all the one or more cells have a polarity indicator that indicates that inversion is needed. If the one or more cells have a mix of polarity indicators (e.g., some that indicate inversion is needed, and others that indicate that inversion is not needed), the bottom-up generation process can perform a pass of polarity fixing. The polarity fixing can comprise, for example: finding all the cells having a polarity indicator indicating inversion is needed (e.g., needsInversion flag is set to true) and inserting N inverters above them, while leaving cells having a polarity indicator indicating inversion is not needed (e.g., needsInversion flag is set to false) as-is. After the polarity fixing, the bottom-up generation process can again determine whether the ICG is capable of driving one or more cells currently connected to an output of the ICG, and add inverters as necessary. Depending on the embodiment, the bottom-up generation process can reduce cell count (e.g., inverter count) within a clock network, can reduce wirelength within a clock network, or both.

Depending on the embodiment, a methodology described herein can be performed (in whole or in part) during or as part of CTS for a circuit design.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for generating a clock network for a circuit design using an inverting integrated clock gate (ICG), according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. As shown, the routing and optimization 114 operation includes a clock network generation using inverting ICG 115 operation, which may be performed in accordance with various embodiments described herein. The clock network generation using inverting ICG 115 operation can generate a clock network for a circuit design using one or more inverting ICGs by, for example, post-processing an existing clock network comprising at least one non-inverting ICG (as described herein) or by generating the clock network bottom-up (as described herein).

While the design process flow 100 shows optimization occurring prior to a layout instance 116, routing, timing analysis and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations: or the design input 112 operation may occur after the initial layout instance 116 is generated. In various embodiments, whenever design inputs are used to update or change an aspect of a circuit design, a timing analysis and the routing and optimization 114 operation may be performed.

FIGS. 2 through 5 are flowcharts illustrating example methods for generating a clock network for a circuit design using an inverting integrated clock gate (ICG), according to some embodiments. Depending on the embodiment, any of one of methods described with respect to FIGS. 2 through 5 can performed as part of a CTS process performed in connection with a circuit design (e.g., by an EDA software system). It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a hardware processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Figure 2:
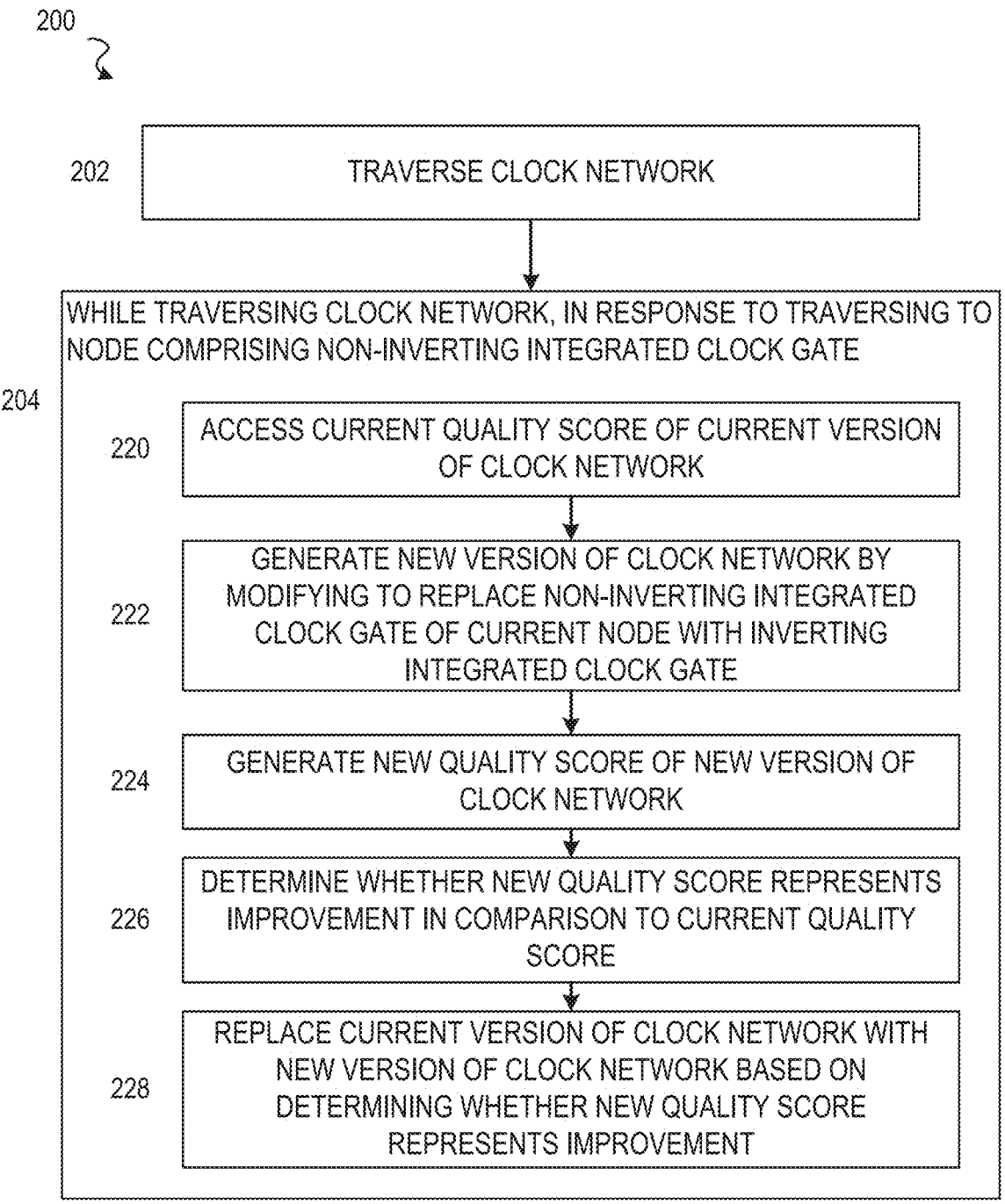
FIGS. 2 through 5 are flowcharts illustrating example methods for generating a clock network for a circuit design using an inverting ICG, according to some embodiments.

Referring now to FIG. 2, the flowchart illustrates the example method 200 for generating a clock network using an inverting ICG by processing (e.g., post processing) an existing clock network that comprises at least one non-inverting ICG, according to some embodiments.

Operation 202 traverses (e.g., begins traversal) of a clock network generated for a circuit design. For some embodiments, the clock network comprises a defined topology, such as a basic tree topology that may be generated as part of a clock tree synthesis (CTS). Depending on the embodiment, the traversal can be performed top down (e.g., starting down from a root clock source of the clock network) or bottom-up (e.g., starting from one or more clock sinks of the clock network).

The method 200 continues with operation 204, which is performed while the clock network is being traversed by operation 202 and performed in response to traversing to a node of the clock network that comprises a non-inverting ICG. For some embodiments, operation 204 is performed each time a node comprising a non-inverting ICG is traversed. As shown, operation 204 can be performed by operations 220 through 228 (e.g., as sub-operations of operation 204).

Operation 220 accesses a current quality score of a current version of the clock network. As described herein, a quality score can be determined by a scoring function, such as a function that measures power usage of the clock network, a function that measures a wirelength of the clock network, or a function that measures capacitance of the clock network. For some embodiments, the quality score can comprise a value determined between a range (e.g., 0 to 100). The initial current quality score of the clock network can be generated prior to performance of operation 204 (e.g., prior to operation 202).

Thereafter, operation 222 generates a new version of the clock network by modifying the current version of the clock network to replace (e.g., swap) the non-inverting integrated clock gate of the current node with an inverting integrated clock gate. For various embodiments, operation 222 replaces a non-inverting integrated clock gate with an inverting integrated clock gate using one of the transforms described herein. For example, operation 222 can determine whether, in the current version of the clock network, an output of the non-inverting integrated clock gate is connected to only inverters (e.g., whether the fan-out of the non-inverting integrated clock gate comprises only inverters). In response to determining that the output of the non-inverting integrated clock gate is connected to only inverters, operation 222 can modify a copy of the current version of the clock network to: remove all inverters connected to an output of the non-inverting integrated clock gate; and replace the non-inverting integrated clock gate with the inverting integrated clock gate. The new version of the clock network would comprise the copy of the current version of the clock network. Examples of such a transform/replacement are illustrated with respect to FIGS. 6 through 8.

As another example, operation 222 can determine whether, in the current version of the clock network, an output of the non-inverting integrated clock gate is connected to at least one inverter and at least one non-inverter cell (e.g., whether the fan-out of the non-inverting integrated clock gate comprises a mix of inverters and non-inverters). In response to determining that the output of the non-inverting integrated clock gate is connected to at least one inverter and at least one non-inverter cell, operation 222 can modify a copy of the current version of the clock network to: remove all inverters connected to an output of the non-inverting integrated clock gate; add an inverter between the non-inverting integrated clock gate and the at least one non-inverter cell; and replace the non-inverting integrated clock gate with the inverting integrated clock gate. The new version of the clock network would comprise the copy of the current version of the clock network.

Operation 224 generates a new quality score of the new version of the clock network generated by operation 222. For some embodiments, the score function used to generate the new quality score is the same score function used to generate the current quality score accessed by operation 220.

Operation 226 determines whether the new quality score represents a quality score improvement in comparison to the current quality score (e.g., that the new version represents an improvement over the current version).

Subsequently, operation 228 replaces the current version of the clock network with the new version of the clock network based on the determination by operation 226. For example, operation 228 can replace the current version of the clock network with the new version of the clock network in response to the new quality score representing a quality score improvement in comparison to the current quality score. With the replacement of the current version of the clock network with the new version of the clock network, the current quality score can be replaced with the new quality score generated by operation 224. In another example, operation 228 can leave the current version as-is in response to the new quality score not representing a quality score improvement in comparison to the current quality score.

Figure 3:
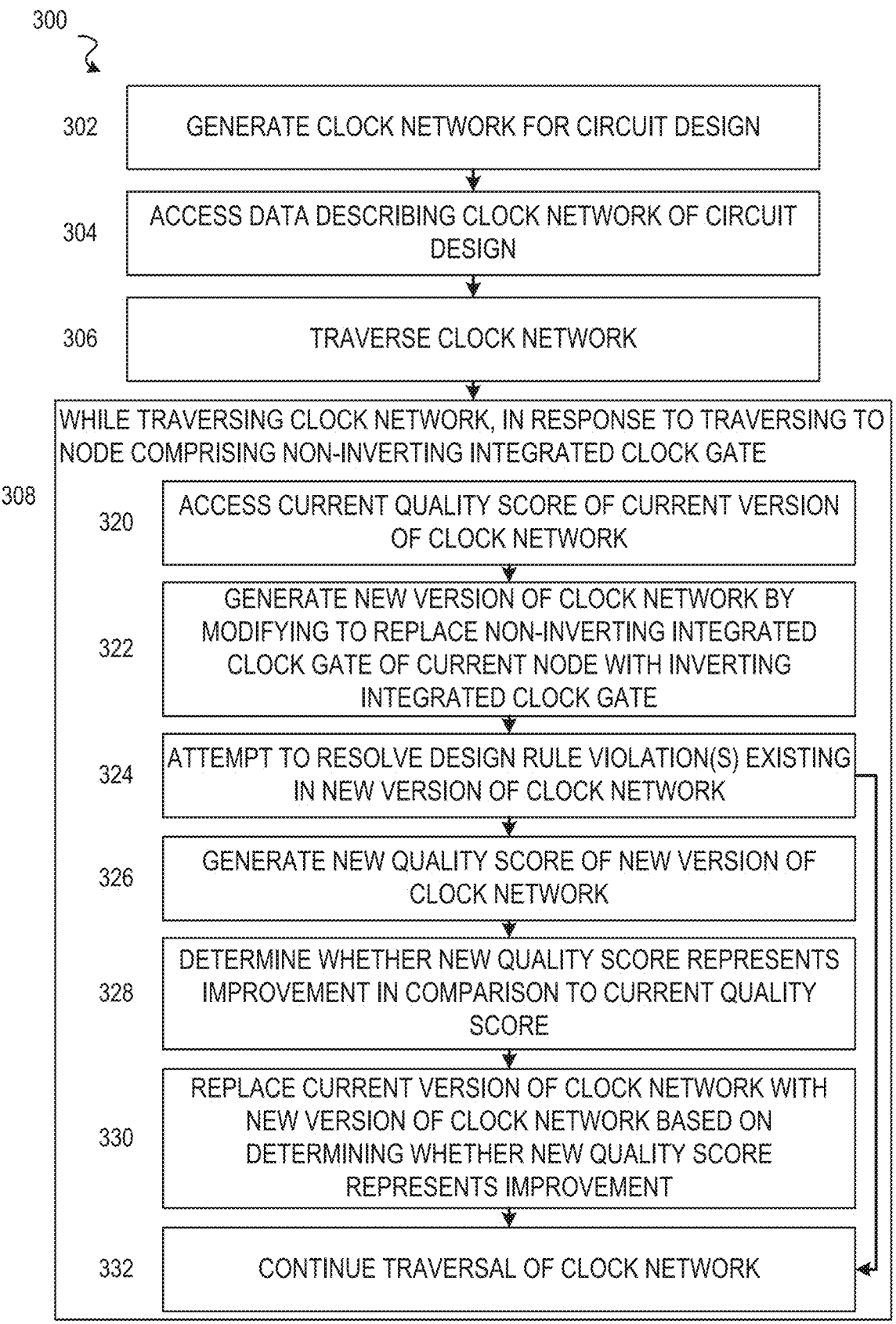

Referring now to FIG. 3, the flowchart illustrates an example method 300 for generating a clock network using an inverting ICG by processing (e.g., post processing) an existing clock network that comprises at least one non-inverting ICG, according to some embodiments. Operation 302 generates a clock network for a circuit design. For some embodiments, the clock network generated by operation 302 comprises a basic tree topology of the clock network. Operation 302 can be performed as part of a CTS process. As a result of operation 302, data describing the clock network of the circuit design can be generated. At operation 304, the data describing the clock network of the circuit design is accessed. For some embodiments, operation 306 is similar to operation 202 of the method 200 described above with respect to FIG. 2.

The method 300 continues with operation 308, which is performed while the clock network is being traversed by operation 306 and performed in response to traversing to a node of the clock network that comprises a non-inverting ICG. For some embodiments, operation 308 is performed each time a node comprising a non-inverting ICG is traversed. As shown, operation 308 can be performed by operations 320 through 332 (e.g., as sub-operations of operation 204). For some embodiments, operations 320 and 322 are respectively similar to operations 220 and 222 of the method 200 described above with respect to FIG. 2.

Operation 324 attempts to resolve one or more design rule violations (DRVs) that exist in the new version of the clock network generated by operation 322. For some embodiments, the method 300 continues to operations 326 through 332 in response to operation 324 resolving the one or more design rule violations that exist in the new version of the clock network. If, however, operation 324 fails to resolve the one or more design rule violations (e.g., fails to resolve at least one DRV), for some embodiments, the method 300 continues to operation 332 and skips operations 326 through 330, thereby leaving the current version of the clock network as-is. This can effectively represent a rejection of the transform represented by the new version of the clock network.

For some embodiments, operations 326, 328, and 330 are respectively similar to operations 224, 226, and 228 of the method 200 described above with respect to FIG. 2.

Operation 332 continues traversal of the clock network, whereby operations 320 through 332 can be performed again in response to traversing to a node that comprises a non-inverting integrated clock gate (ICG).

Though FIGS. 2 and 3 are described herein with respect to swapping a non-inverting integrated clock gate for an inverting integrated clock gate, some embodiments provide for a similar method that swaps an inverting integrated clock gate for a non-inverting integrated clock gate.

Figure 4:
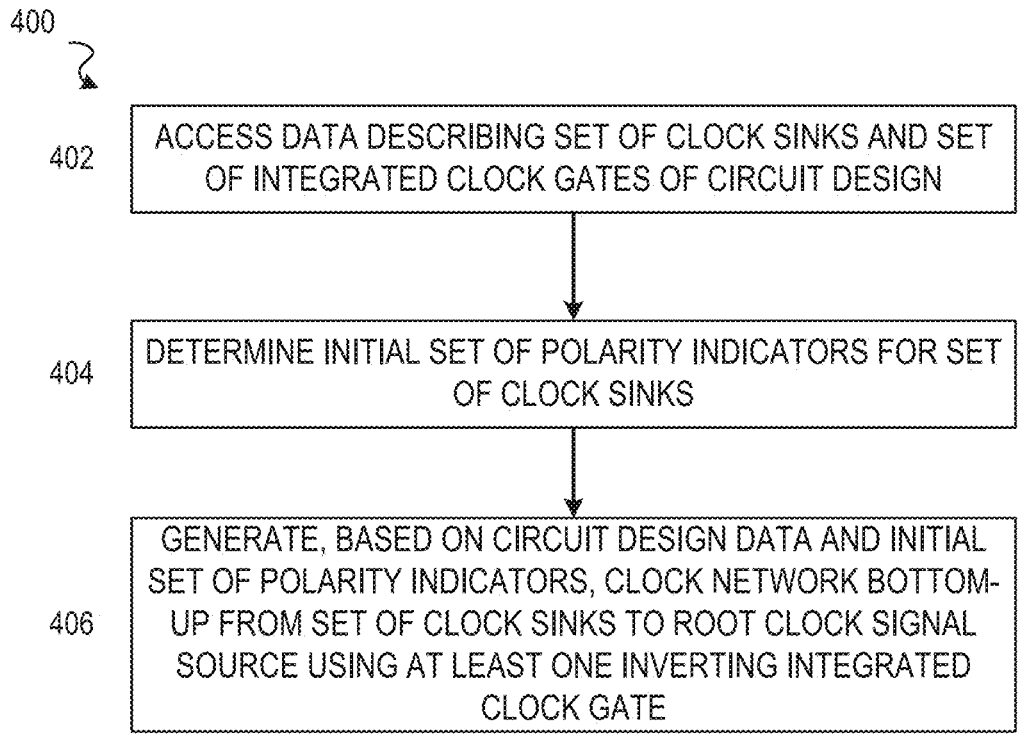

Referring now to FIG. 4, the flowchart illustrates the example method 400 for generating a clock network bottom-up using an inverting ICG, according to some embodiments. Operation 402 accesses circuit design data describing a set of clock sinks and a set of integrated clock gates (ICGs) of a circuit design. At operation 404, an initial set of polarity indicators is determined for the set of clock sinks, where a polarity indicator (e.g., each polarity indicator) in the initial set of polarity indicators indicates a polarity requirement (e.g., needs inversion or does not need inversion) for a clock sink (e.g., for each clock sink) in the set of clock sinks. Subsequently, based on the data and the initial set of polarity indicators determined by operation 404, operation 406 generates a clock network bottom-up, from the set of clock sinks to a root clock signal source, using at least one inverting integrated clock gate (ICG). For some embodiments, operation 406 performs method 500 of FIG. 5 to facilitate the bottom-up generation of the clock network.

Figure 5:
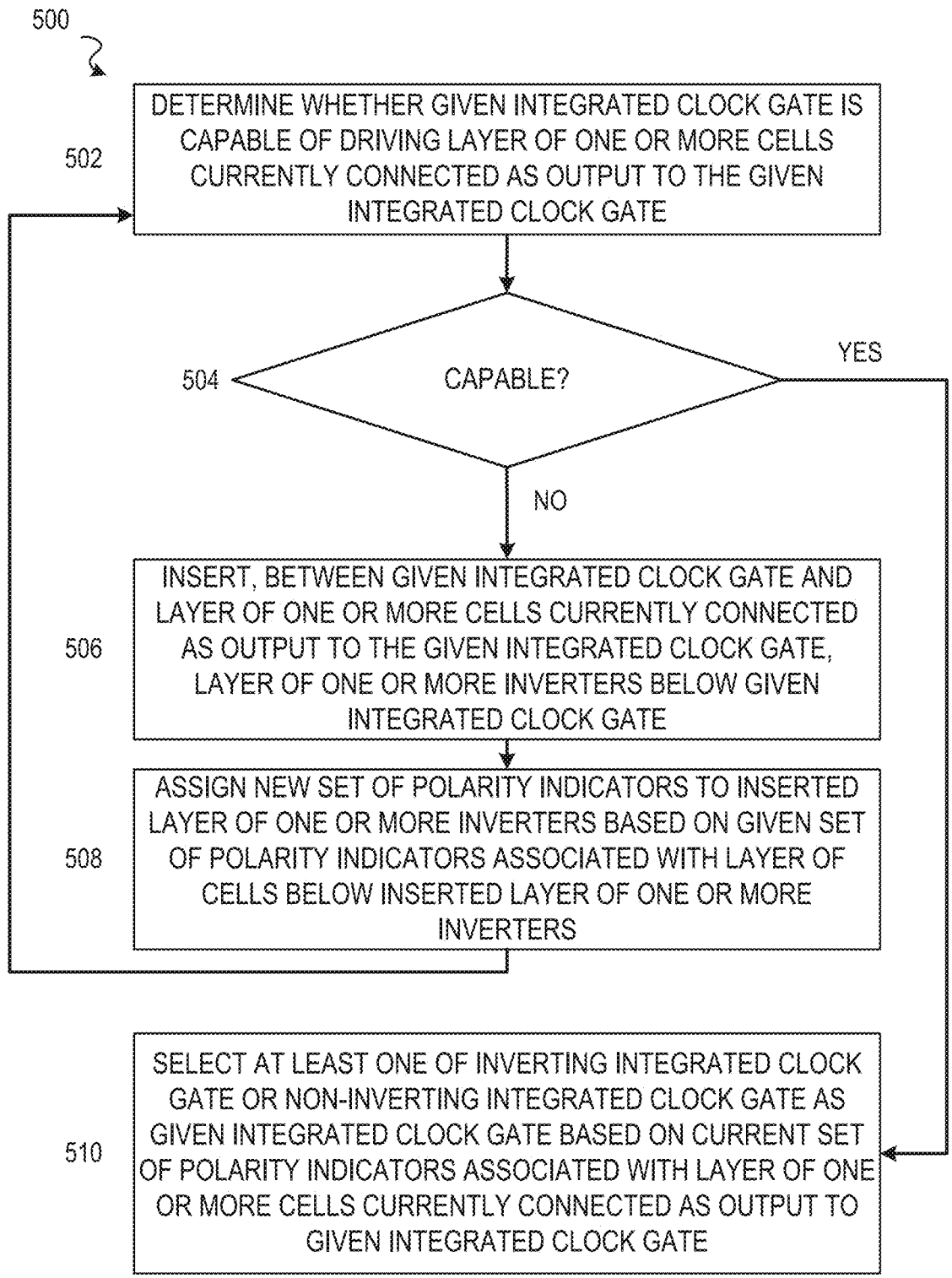

Referring now to FIG. 5, the flowchart illustrates an example method 500 used in generating a clock network bottom-up using an inverting ICG, according to some embodiments. In particular, for some embodiments, the method 500 is performed as part of operation 406 of the method 400 described above with respect to FIG. 4. For example, the method 500 can be performed to generate a portion of the clock network, between a given integrated clock gate in the set of integrated clock gates and a given subset of clock sinks from the set of clock sinks, by iteratively performing the operations of the method 500, until the given integrated clock gate is capable of driving a layer of one or more cells currently connected as output to the given integrated clock gate.

In particular, operation 502 determines whether a given integrated clock gate capable of driving a layer of one or more cells currently connected as output to the given integrated clock gate. At operation 504, if the given integrated clock gate is determined to not be capable of driving the layer of one or more cells currently connected as output to the given integrated clock gate, the method 500 continues to operation 506; otherwise the method 500 continues to operation 510.

Operation 506 inserts, between the given integrated clock gate and the layer of one or more cells currently connected as output to the given integrated clock gate, a layer of one or more inverters below the given integrated clock gate. For some embodiments, the inserted layer of one or more inverters becomes currently connected as output to the given integrated clock gate.

Thereafter, operation 508 assigns a new set of polarity indicators to the inserted layer of one or more inverters based on a given set of polarity indicators associated with a layer of cells below the inserted layer of one or more inverters (e.g., the layer of one or more cells that was connected as output to the given integrated clock gate prior to operation 506). For some embodiments, operation 508 comprises generating the new set of polarity indicators to comprise a version of the given set of polarity indicators with polarity indicators inverted (e.g., the polarity indicators are flipped), and then assigning the new set of polarity indicators to the inserted layer of one or more inverters. By operation 508, the method 500 can facilitate flipping and propagating the given set of polarity indicators to the inserted layer of one or more inverters. After operation 508, the method 500 returns to operation 502 to perform another possible iteration of inserting a layer of one or more inverters (e.g., by operations 506 and 508).

Operation 510 selects at least one of an inverting integrated clock gate or a non-inverting integrated clock gate as (i.e., to be) the given integrated clock gate based on a current set of polarity indicators associated with the layer of one or more cells currently connected as output to the given integrated clock gate. For example, operation 510 can comprise determining whether the current set of polarity indicators indicate that the layer of one or more cells currently connected as output to the given integrated clock gate requires inversion. In response to determining that the current set of polarity indicators indicates that the layer of one or more cells currently connected as output to the given integrated clock gate requires inversion, operation 510 can select an inverting integrated clock gate as the given integrated clock gate. Alternatively, in response to determining that the current set of polarity indicators indicates that the layer of one or more cells currently connected as output to the given integrated clock gate does not require inversion, operation 510 can select a non-inverting integrated clock gate as the given integrated clock gate.

According to some embodiments, after operation 510, bottom-up generation of a clock network (e.g., by operation 406) can proceed.

Figure 6:
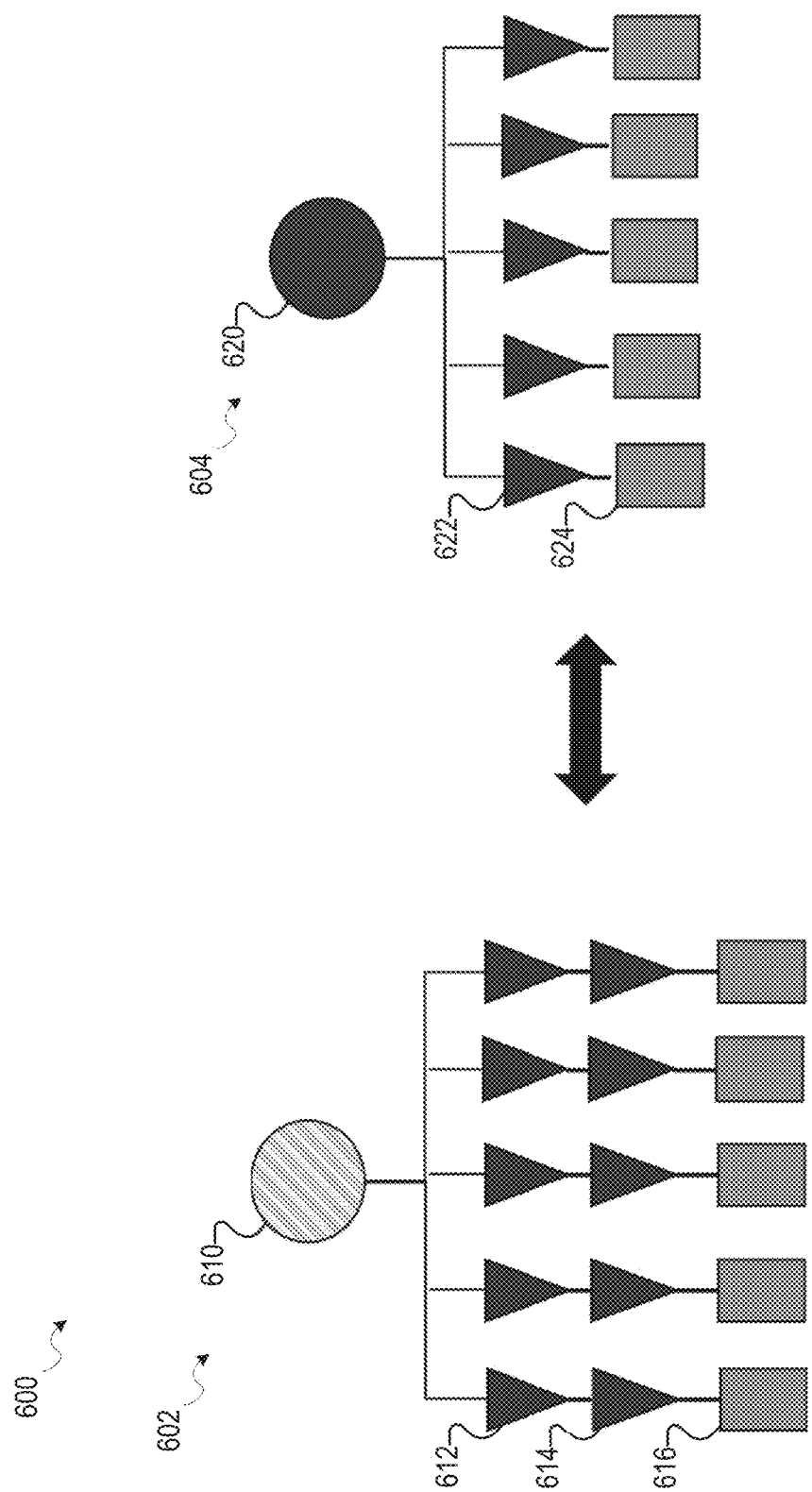
FIGS. 6 through 8 illustrate example transforms that can be used to generate a clock network, according to some embodiments.
Figure 7:
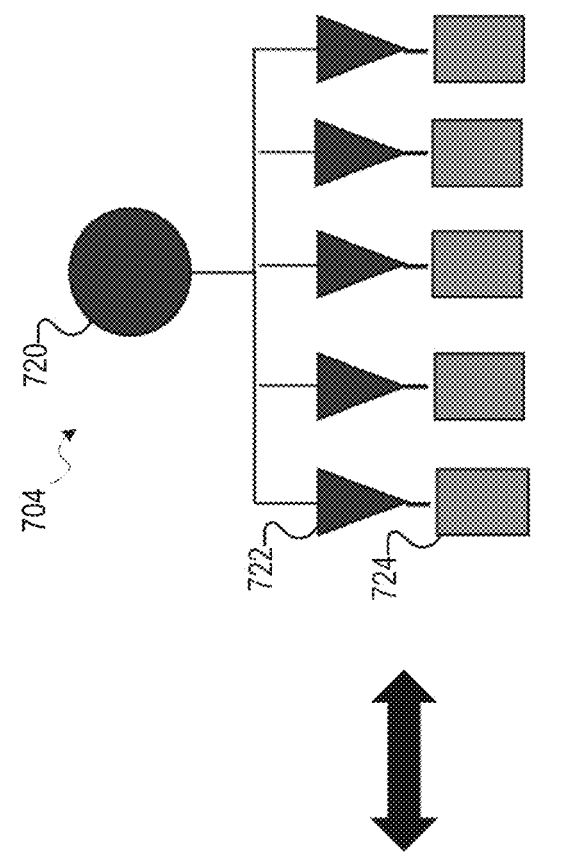
Figure 7:
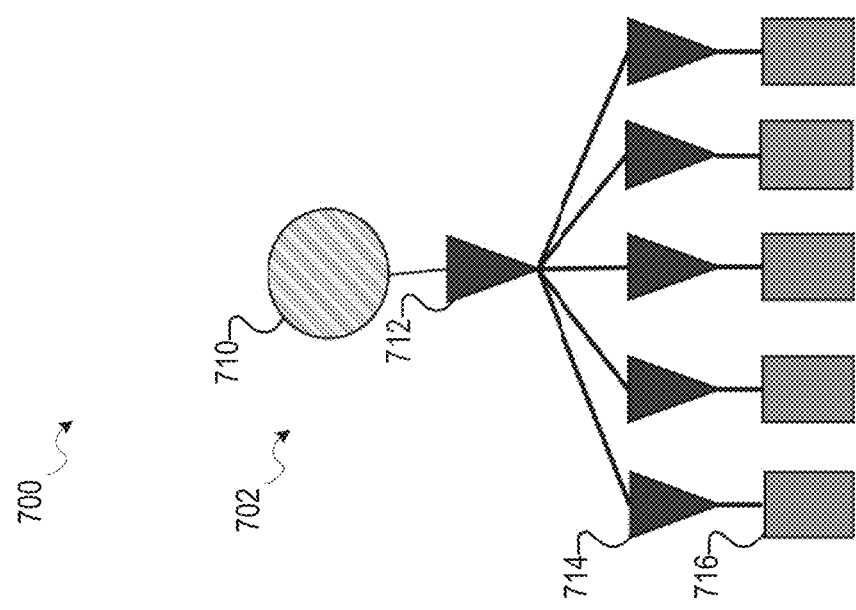
Figure 8:
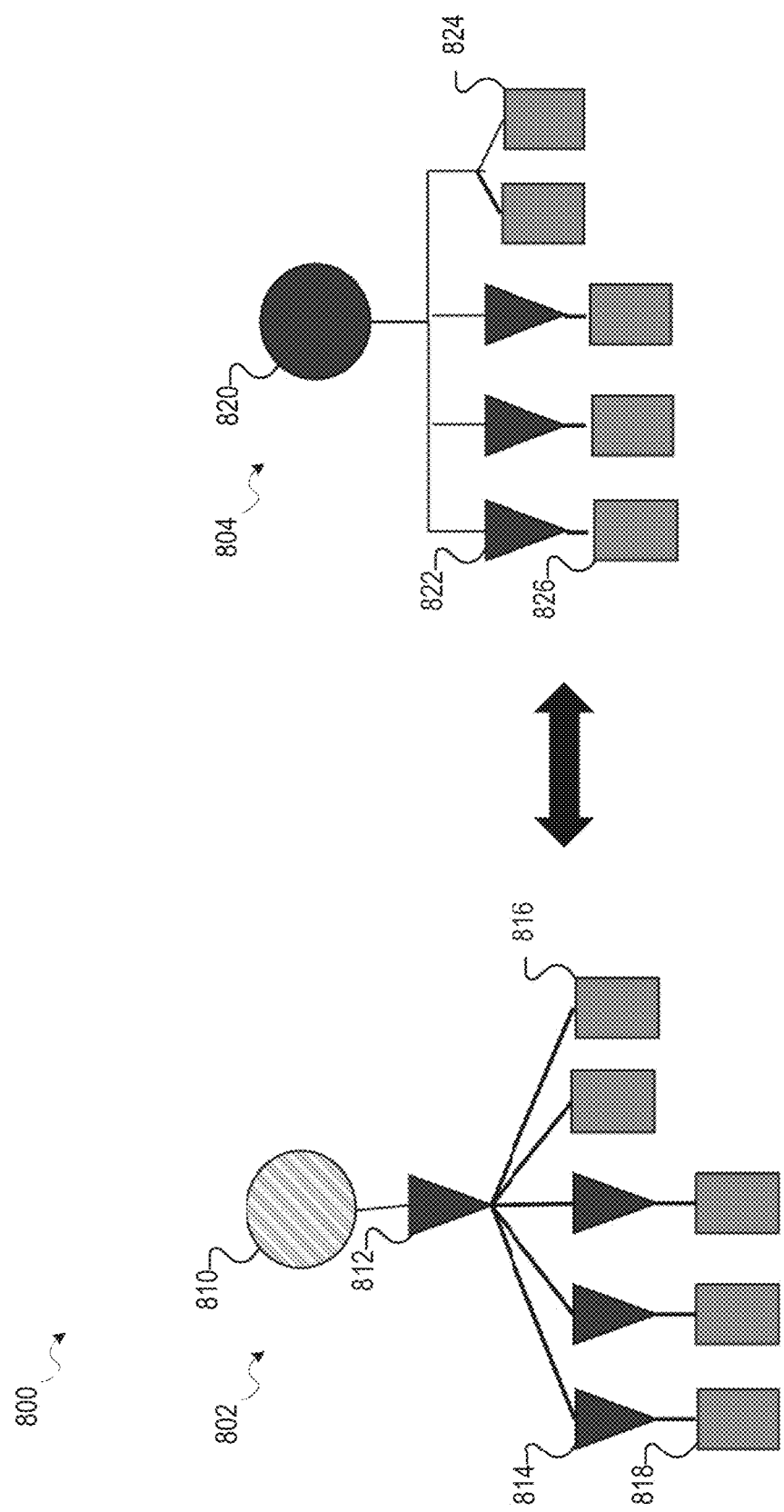

FIGS. 6 through 8 illustrate example transforms that can be used to generate a clock network, according to some embodiments. The transforms described with respect to FIGS. 6 through 8 can be used (e.g., applied) by the method 200 of FIG. 2 or the method 300 of FIG. 3.

Referring now to FIG. 6, an example transform 600 is illustrated between a portion 602 of a clock network that comprises a non-inverting ICG 610, and a portion 604 of a clock network that comprises an inverting ICG 620. Accordingly, a transform from the portion 602 to the portion 604 illustrates a non-inverting ICG-to-inverting ICG transform that can be applied by some embodiments, while a transform from the portion 604 to the portion 602 illustrates an inverting ICG-to-non-inverting ICG transform that can be applied by some embodiments. As shown, for the portion 602, the output (e.g., the fan-out) of the non-inverting ICG 610 is connected to a layer of inverters 612, the outputs of those inverters are respectively connected to a layer of inverters 614, and the outputs of those inverters are respectively connected to a layer of cells 616. For the portion 604, the output (e.g., the fan-out) of the inverting ICG 620 is connected to a layer of inverters 622, and the outputs of those inverters are respectively connected to a layer of cells 624. Each of the cells within the layer of cells 616 and the layer of cells 624 can comprise an inverting or a non-inverting cell. The portion 602 illustrates an example non-inverting ICG having an output connected to all inverting cells (e.g., having a fan-out that comprises all inverting cells), while the portion 604 illustrates an example inverting ICG having an output connected to all inverting cells (e.g., having a fan-out that comprises all inverting cells). The transform from the portion 602 to the portion 604 illustrates that the non-inverting ICG 610 is swapped for the inverting ICG 620, and the layer of inverters 612 connected to the output of the non-inverting ICG 610 is removed. The transform from the portion 604 to the portion 602 illustrates that the inverting ICG 620 is swapped for the non-inverting ICG 610, and the layer of inverters 612 is added below the non-inverting ICG 610 and connected to the output of the non-inverting ICG 610.

Referring now to FIG. 7, an example transform 700 is illustrated between a portion 702 of a clock network that comprises a non-inverting ICG 710, and a portion 704 of a clock network that comprises an inverting ICG 720. Accordingly, a transform from the portion 702 to the portion 704 illustrates a non-inverting ICG-to-inverting ICG transform that can be applied by some embodiments, while a transform from the portion 704 to the portion 702 illustrates an inverting ICG-to-non-inverting ICG transform that can be applied by some embodiments. As shown, for the portion 702, the output (e.g., the fan-out) of the non-inverting ICG 710 is connected to a single inverter 712, the output of that single inverter is connected to a layer of inverters 714, and the outputs of those inverters are respectively connected to a layer of cells 716. For the portion 704, the output (e.g., the fan-out) of the inverting ICG 720 is connected to a layer of inverters 722, and the outputs of those inverters are respectively connected to a layer of cells 724. Each of the cells within the layer of cells 716 and the layer of cells 724 can comprise an inverting or a non-inverting cell. Similar to the portions of FIG. 6, the portion 702 illustrates an example non-inverting ICG having an output connected to all inverting cells (e.g., having a fan-out that comprises all inverting cells), while the portion 704 illustrates an example inverting ICG having an output connected to all inverting cells (e.g., having a fan-out that comprises all inverting cells). The transform from the portion 702 to the portion 704 illustrates that the non-inverting ICG 710 is swapped for the inverting ICG 720, and the single inverter 712 connected to the output of the non-inverting ICG 710 is removed. The transform from the portion 704 to the portion 702 illustrates that the inverting ICG 720 is swapped for the non-inverting ICG 710, and the single inverter 712 is added below the non-inverting ICG 710 and connected to the output of the non-inverting ICG 710. For some embodiments, the number of inverters in the layer below the non-inverting ICG 710 depends on the circuit design (e.g., design rule constraints, etc.).

Referring now to FIG. 8, an example transform 800 is illustrated between a portion 802 of a clock network that comprises a non-inverting ICG 810, and a portion 804 of a clock network that comprises an inverting ICG 820. Accordingly, a transform from the portion 802 to the portion 804 illustrates a non-inverting ICG-to-inverting ICG transform that can be applied by some embodiments, while a transform from the portion 804 to the portion 802 illustrates an inverting ICG-to-non-inverting ICG transform that can be applied by some embodiments. As shown, for the portion 802, the output (e.g., the fan-out) of the non-inverting ICG 810 is connected to a single inverter 812, the output of that single inverter is connected to a set of inverters 814 and a set of cells 816, and the outputs of the set of inverters 814 are respectively connected to a set of cells 818. For the portion 804, the output (e.g., the fan-out) of the inverting ICG 820 is connected to a set of inverters 822 and a set of cells 824, and the outputs of the set of inverters 822 are respectively connected to a set of cells 826. Each of the cells within the set of cells 816, the set of cells 818, the set of cells 824, and the set of cells 826 can comprise an inverting or a non-inverting cell. Similar to the portions of FIG. 7, the portion 802 illustrates an example non-inverting ICG having an output connected to all inverting cells (e.g., having a fan-out that comprises all inverting cells), while the portion 804 illustrates an example inverting ICG that may have an output connected to a mixture of inverting cells (822) and at least one non-inverting cell (824) (e.g., having a fan-out that can comprises a mixture of inverting and non-inverting cells). The transform from the portion 802 to the portion 804 illustrates that the non-inverting ICG 810 is swapped for the inverting ICG 820, and the single inverter 812 connected to the output of the non-inverting ICG 810 is removed. The transform from the portion 804 to the portion 802 illustrates that the inverting ICG 820 is swapped for the non-inverting ICG 810, and the single inverter 812 is added below the non-inverting ICG 810 and connected to the output of the non-inverting ICG 810. For some embodiments, the number of inverters in the layer below the non-inverting ICG 810 depends on the circuit design (e.g., design rule constraints, etc.).

Figure 9:
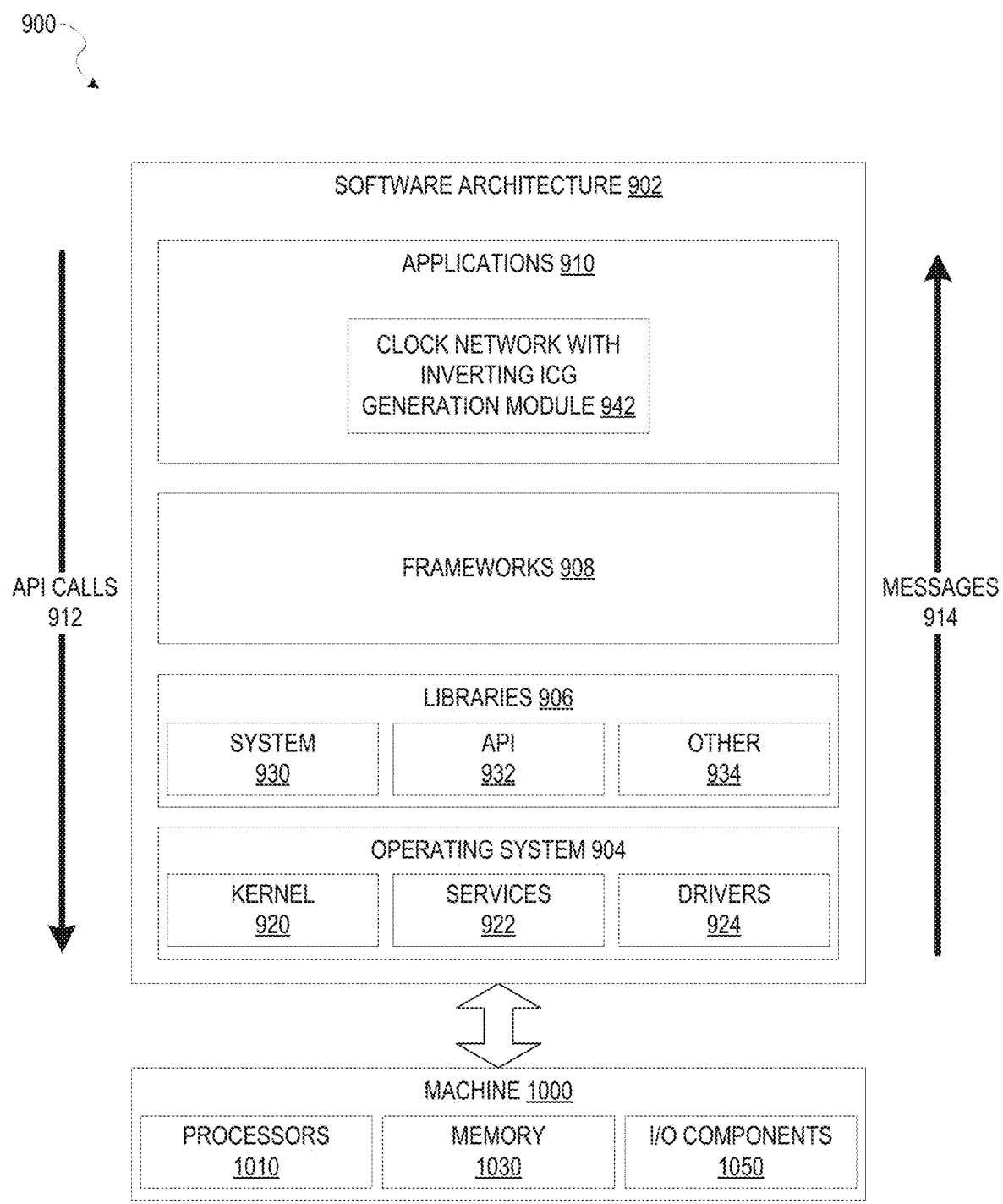
FIG. 9 is a block diagram illustrating an example of a software architecture that may be operating on an electronic design automation (EDA) computing device and may be used with methods for generating a clock network for a circuit design using an inverting ICG, according to some embodiments.

FIG. 9 is a block diagram 900 illustrating an example of a software architecture 902 that may be operating on an EDA computer and may be used with methods for generating a clock network with an inverting integrated clock gate (ICG), according to some example embodiments. The software architecture 902 can be used as an EDA computing device to implement any of the methods described above. Aspects of the software architecture 902 may, in various embodiments, be used to store circuit designs, and to generate a clock network using an inverting ICGs in an EDA environment to generate circuit designs, from which physical devices may be generated.

FIG. 9 is merely a non-limiting example of a software architecture 902, and it will be appreciated that many other architectures can be implemented to facilitate the functionality described herein. In various embodiments, the software architecture 902 is implemented by hardware such as a machine 1000 of FIG. 10 that includes processors 1010 (e.g., hardware processors), memory 1030, and I/O components 1050. In this example, the software architecture 902 can be conceptualized as a stack of layers where each layer may provide a particular functionality. For example, the software architecture 902 includes layers such as an operating system 904, libraries 906, software frameworks 908, and applications 910. Operationally, the applications 910 invoke application programming interface (API) calls 912 through the software stack and receive messages 914 in response to the API calls 912, consistent with some embodiments. In various embodiments, any client device, any server computer of a server system, or any other device described herein may operate using elements of the software architecture 902. An EDA computing device described herein may additionally be implemented using aspects of the software architecture 902, with the software architecture 902 adapted for operating to generate a clock network for a circuit design in any manner described herein.

In one embodiment, an EDA application of the applications 910 generates a clock network for a circuit design using an inverting integrated clock gate (ICG) according to embodiments described herein using various modules within the software architecture 902. For example, in one embodiment, an EDA computing device similar to the machine 1000 includes the memory 1030 and the one or more processors 1010. The processors 1010 also implement a clock network with inverting ICG generation module 942 for generating a clock network for a circuit design using an inverting ICG in accordance with various embodiments described herein.

In various other embodiments, rather than being implemented as modules of the one or more applications 910, the clock network with inverting ICG generation module 942 may be implemented using elements of the libraries 906, the operating system 904, or the software frameworks 908.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 such as libraries of blocks for use in an EDA environment or other libraries that can provide functions such as memory allocation functions, string manipulation functions, mathematic functions, and the like. In addition, the libraries 906 can include API libraries 932 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 may also include other libraries 934.

The software frameworks 908 provide a high-level common infrastructure that can be utilized by the applications 910, according to some embodiments. For example, the software frameworks 908 provide various graphic user interface (GUI) functions, high-level resource management, high-level location services, and so forth. The software frameworks 908 can provide a broad spectrum of other APIs that can be utilized by the applications 910, some of which may be specific to a particular operating system 904 or platform. In various embodiments, the systems, methods, devices, and instructions described herein may use various files, macros, libraries, and other elements of an EDA design environment to implement clock network generation for a circuit design using an inverting ICG as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 902, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose hardware processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1000 including processors 1010), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1000, but deployed across a number of machines 1000. In some example embodiments, the processors 1010 or processor-implemented modules are located in a single geographic location (e.g., within a home environment, an office environment, or a server farm). In other example embodiments, the processors or processor-implemented modules are distributed across a number of geographic locations.

Figure 10:
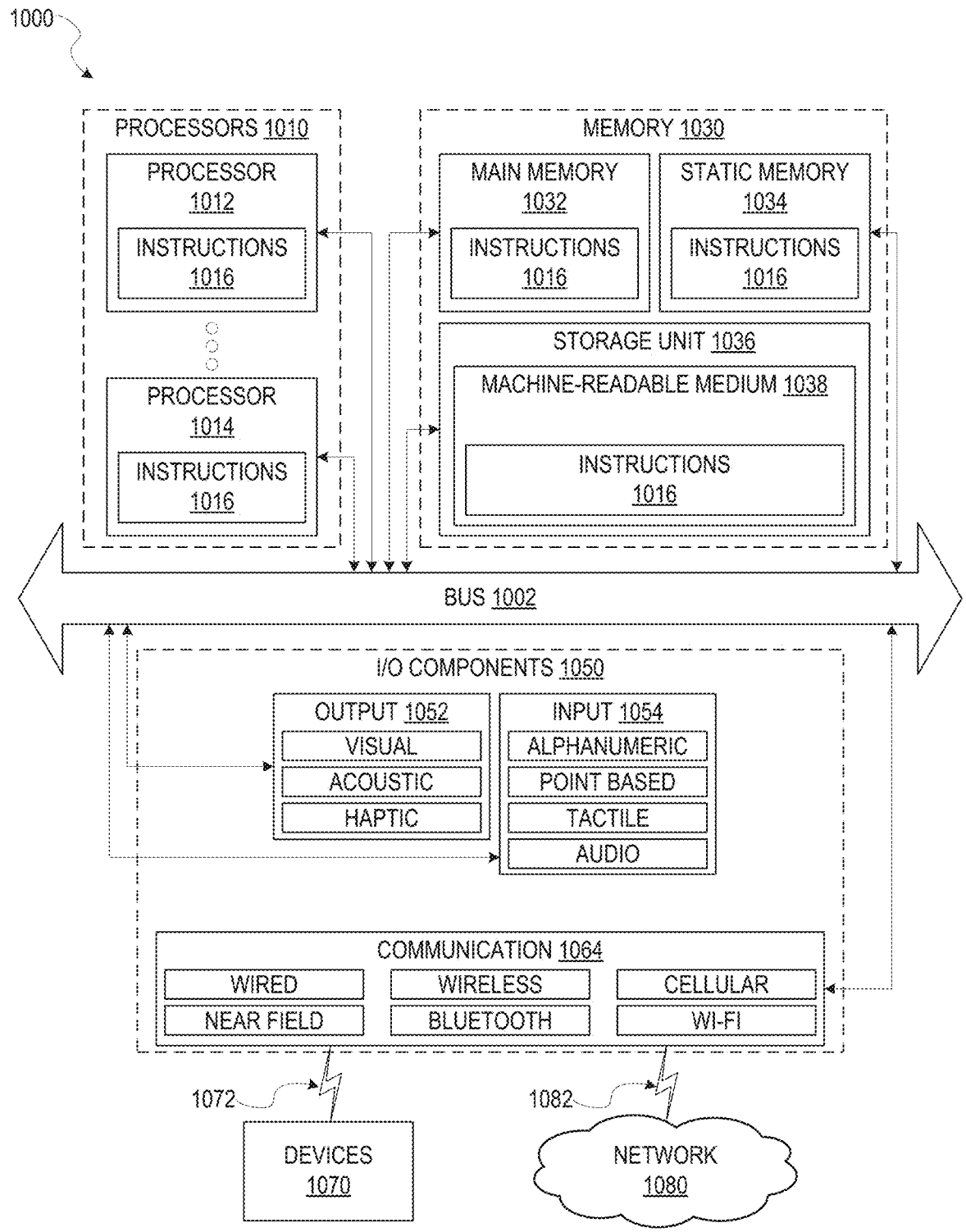
FIG. 10 is a diagram representing a machine in the form of a computer system within which a set of instructions are executed, causing the machine to perform any one or more of the methods discussed herein, according to some example embodiments.

FIG. 10 is a diagrammatic representation of the machine 1000 in the form of a computer system within which a set of instructions may be executed for causing the machine 1000 to perform any one or more of the methodologies discussed herein, according to an example embodiment. FIG. 10 shows components of the machine 1000, which is, according to some embodiments, able to read instructions from a machine-readable medium (e.g., a machine-readable storage medium) and perform any one or more of the methodologies discussed herein. Specifically. FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute the instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1010 with a single core, multiple processors 1010 with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., the instructions 1016) for execution by a machine (e.g., the machine 1000), such that the instructions, when executed by one or more processors of the machine (e.g., the processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a USB).

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling.

Furthermore, the machine-readable medium 1038 is non-transitory (in other words, not having any transitory signals) in that it does not embody a propagating signal. However, labeling the machine-readable medium 1038 "non-transitory" should not be construed to mean that the machine-readable medium 1038 is incapable of movement; the machine-readable medium 1038 should be considered as being transportable from one physical location to another. Additionally, since the machine-readable medium 1038 is tangible, the machine-readable medium 1038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
   accessing, by a hardware processor, data that describes a clock network of a circuit design;
   traversing, by the hardware processor, the clock network; and
   while traversing the clock network, in response to traversing to a current node of the clock network that comprises a non-inverting integrated clock gate:
      accessing, by the hardware processor, a current quality score of a current version of the clock network, the current quality score being calculated by applying a scoring function on the current version of the clock network;
      generating, by the hardware processor, a new version of the clock network by modifying a copy of the current version of the clock network to replace the non-inverting integrated clock gate of the current node with an inverting integrated clock gate by;
         determining whether in the copy an output of the non-inverting integrated clock gate is connected to at least one inverter and at least one non-inverter cell; and
         in response to determining that in the copy, the output of the non-inverting integrated clock gate is connected to at least one inverter and at least one non-inverter cell, modifying the copy to:
            remove all inverters connected to an output of the non-inverting integrated clock gate;
            add an inverter between the non-inverting integrated clock gate and at least one non-inverter cell; and
            replace the non-inverting integrated clock gate with the inverting integrated clock gate, the new version of the clock network comprising the copy;
      generating, by the hardware processor, a new quality score of the new version of the clock network, the new quality score being calculated by applying the scoring function to the new version of the clock network;
      determining, by the hardware processor, whether the new quality score represents a quality score improvement in comparison to the current quality score; and
      replacing, by the hardware processor, the current version of the clock network with the new version of the clock network based on the determining whether the new quality score represents a quality score improvement in comparison to the current quality score.

2. The method of claim 1, wherein the scoring function comprises at least one of a function for measuring power usage, a function for measuring wirelength, or a function for measuring capacitance.

3. The method of claim 1, further comprising:
   while traversing the clock network, in response to traversing to the current node that comprises the non-inverting integrated clock gate:
   prior to the generating the new quality score, attempting to resolve, by the hardware processor, one or more design rule violations existing in the new version of the clock network.

4. The method of claim 1, wherein the replacing the current version of the clock network with the new version of the clock network based on the determining whether the new quality score represents a quality score improvement in comparison to the current quality score comprises:
   replacing the current version of the clock network with the new version of the clock network in response to the new quality score representing a quality score improvement in comparison to the current quality score.

5. The method of claim 1, further comprising:
   while traversing the clock network, in response to traversing to the current node that comprises the non-inverting integrated clock gate:
   after the replacing the current version of the clock network with the new version of the clock network, continuing traversal of the clock network.

6. The method of claim 1, wherein the modifying the copy comprises:
   determining whether in the copy, an output of the non-inverting integrated clock gate is connected to only inverters; and
   in response to determining that in the copy, the output of the non-inverting integrated clock gate is connected to only inverters, modifying the copy to:
      remove all inverters connected to an output of the non-inverting integrated clock gate; and
      replace the non-inverting integrated clock gate with the inverting integrated clock gate, the new version of the clock network comprising the copy.

7. A device comprising:
   a memory storing instructions; and
   a hardware processor communicatively coupled to the memory and configured by the instructions to perform operations comprising:
      accessing data that describes a clock network for a circuit design;
      traversing the clock network; and
      while traversing the clock network, in response to traversing to a current node of the clock network that comprises a non-inverting integrated clock gate:
         accessing a current quality score of a current version of the clock network, the current quality score being calculated by applying a scoring function on the current version of the clock network;
         generating a new version of the clock network by modifying a copy of the current version of the clock network to replace the non-inverting integrated clock gate of the current node with an inverting integrated clock gate by:
            determining whether in the copy an output of the non-inverting integrated clock gate is connected to at least one inverter and at least one non-inverter cell; and in response to determining that in the copy the output of the non-inverting integrated clock gate is connected to at least one inverter and at least one non-inverter cell, modifying the copy to:
    remove all inverters connected to an output of the non-inverting integrated clock gate;
    add an inverter between the non-inverting integrated clock gate and at least one non-inverter cell; and
    replace the non-inverting integrated clock gate with the inverting integrated clock gate, the new version of the clock network comprising the copy;
generating a new quality score of the new version of the clock network, the new quality score being calculated by applying the scoring function to the new version of the clock network;
determining whether the new quality score represents a quality score improvement in comparison to the current quality score; and
replacing the current version of the clock network with the new version of the clock network based on the determining whether the new quality score represents a quality score improvement in comparison to the current quality score.

8. The device of claim 7, wherein the scoring function comprises at least one of a function for measuring power usage, a function for measuring wirelength, or a function for measuring capacitance.

9. The device of claim 7, wherein the operations further comprise:
while traversing the clock network, in response to traversing to the current node that comprises the non-inverting integrated clock gate:
    prior to the generating the new quality score, attempting to resolve one or more design rule violations existing in the new version of the clock network.

10. The device of claim 7, wherein the replacing the current version of the clock network with the new version of the clock network based on the determining whether the new quality score represents a quality score improvement in comparison to the current quality score comprises:
replacing the current version of the clock network with the new version of the clock network in response to the new quality score representing a quality score improvement in comparison to the current quality score.

11. The device of claim 7, wherein the operations further comprise:
while traversing the clock network, in response to traversing to the current node that comprises the non-inverting integrated clock gate:
    after the replacing the current version of the clock network with the new version of the clock network, continuing traversal of the clock network.

12. The device of claim 7, wherein the modifying the copy comprises:
determining whether in the copy, an output of the non-inverting integrated clock gate is connected to only inverters; and
in response to determining that in the copy, the output of the non-inverting integrated clock gate is connected to only inverters, modifying the copy to:
    remove all inverters connected to the output of the non-inverting integrated clock gate; and
    replace the non-inverting integrated clock gate with the inverting integrated clock gate, the new version of the clock network comprising the copy.

13. A non-transitory computer-readable medium comprising instructions that, when executed by a hardware processor of a device, cause the device to perform operations comprising:
accessing data that describes a clock network of a circuit design;
traversing the clock network; and
while traversing the clock network, in response to traversing to a current node of the clock network that comprises a non-inverting integrated clock gate:
    accessing a current quality score of a current version of the clock network, the current quality score being calculated by applying a scoring function on the current version of the clock network;
    generating a new version of the clock network by modifying a copy of the current version of the clock network to replace the non-inverting integrated clock gate of the current node with an inverting integrated clock gate by:
        determining whether in the copy, an output of the non-inverting integrated clock gate is connected to at least one inverter and at least one non-inverter cell; and
        in response to determining that in the copy, the output of the non-inverting integrated clock gate is connected to at least one inverter and at least one non-inverter cell, modifying the copy to:
            remove all inverters connected to an output of the non-inverting integrated clock gate;
            add an inverter between the non-inverting integrated clock gate and at least one non-inverter cell; and
            replace the non-inverting integrated clock gate with the inverting integrated clock gate, the new version of the clock network comprising the copy;
    generating a new quality score of the new version of the clock network, the new quality score being calculated by applying the scoring function to the new version of the clock network;
    determining whether the new quality score represents a quality score improvement in comparison to the current quality score; and
    replacing the current version of the clock network with the new version of the clock network based on the determining whether the new quality score represents a quality score improvement in comparison to the current quality score.

14. The non-transitory computer-readable medium of claim 13, wherein the scoring function comprises at least one of a function for measuring power usage, a function for measuring wirelength, or a function for measuring capacitance.

15. The non-transitory computer-readable medium of claim 13, wherein the operations further comprise:
while traversing the clock network, in response to traversing to the current node that comprises the non-inverting integrated clock gate:
    prior to the generating the new quality score, attempting to resolve one or more design rule violations existing in the new version of the clock network.

16. The non-transitory computer-readable medium of claim 13, wherein the replacing the current version of the clock network with the new version of the clock network based on the determining whether the new quality score represents a quality score improvement in comparison to the current quality score comprises:
  replacing the current version of the clock network with the new version of the clock network in response to the new quality score representing a quality score improvement in comparison to the current quality score.

17. The non-transitory computer-readable medium of claim 13, wherein the operations further comprise:
  while traversing the clock network, in response to traversing to the current node that comprises the non-inverting integrated clock gate:
    after the replacing the current version of the clock network with the new version of the clock network, continuing traversal of the clock network.

18. The non-transitory computer-readable medium of claim 13, wherein the modifying the copy comprises:
  determining whether in the copy, an output of the non-inverting integrated clock gate is connected to only inverters; and
  in response to determining that in the copy, the output of the non-inverting integrated clock gate is connected to only inverters, modifying the copy to:
    remove all inverters connected to the output of the non-inverting integrated clock gate; and
    replace the non-inverting integrated clock gate with the inverting integrated clock gate, the new version of the clock network comprising the copy.

* * * * *